United States Patent [19]

Eubanks et al.

[11] 3,769,177
[45] Oct. 30, 1973

[54] PURIFICATION OF CARBOXYLIC ACIDS BY PLURAL STAGE DISTILLATION WITH SIDE STREAM DRAW-OFFS

[75] Inventors: Lloyd S. Eubanks, Texas City; Krouse S. McMahon, El Lago; John T. Payne, Texas City, all of Tex.; Frederick E. Rosenberger, Des Peres, Mo.

[73] Assignee: Monsanto Company, St. Louis, Mo.

[22] Filed: Nov. 10, 1971

[21] Appl. No.: 197,434

[52] U.S. Cl.................. 203/71, 203/15, 203/16, 203/98, 203/99, 260/540, 260/541
[51] Int. Cl............................................. C07c 51/44
[58] Field of Search .................. 203/99, 98, 73, 74, 203/15, 16, 81, 75, 82; 260/540–542

[56] References Cited
UNITED STATES PATENTS

| 3,490,997 | 1/1970 | Burney et al. | 260/541 |
| 3,084,109 | 4/1963 | Ure et al. | 260/541 |
| 2,384,374 | 9/1945 | Harrison | 203/81 |
| 2,147,306 | 2/1939 | McCulloch | 203/82 |
| 3,507,755 | 4/1970 | Bitners et al. | 203/98 |
| 3,518,165 | 6/1970 | Ward | 203/99 |
| 3,700,566 | 10/1972 | Bellinger et al. | 203/99 |
| 3,210,271 | 10/1965 | Byerly et al. | 203/82 |

Primary Examiner—Wilbur L. Bascomb, Jr.
Attorney—Thomas B. Leslie et al.

[57] ABSTRACT

A process for the removal and recovery of halogen components and the drying of aqueous monocarboxylic acids, particularly those produced by the reaction of an alcohol or olefin and carbon monoxide in the presence of a catalytic system comprising a Group VIII metal component and a halogen component containing bromine or iodine and at least a portion of the halogen component being either an alkyl halide or a hydrogen halide. The process comprises introducing a monocarboxylic acid stream containing water and the halogen contaminant into a first distillation column, removing an overhead fraction containing primarily alkyl halide, removing a bottoms fraction from said first distillation column containing the hydrogen halides present in said column, taking a stream from the middle portion of said first distillation column and introducing it into the upper half of a second distillation column, removing an overhead fraction consisting primarily of the water charged thereto, taking a stream from the middle portion of the second distillation column and recycling such stream to the lower half of the first distillation column, said stream containing essentially all of the hydrogen halide present in said second distillation column, and removing a product acid stream at or near the bottom of said second distillation column, the product acid stream being essentially dry and substantially free of the halogen components charged to the first column. The method is particularly applicable to the removal of water and iodine-containing compounds from acetic and propionic acids.

17 Claims, 1 Drawing Figure

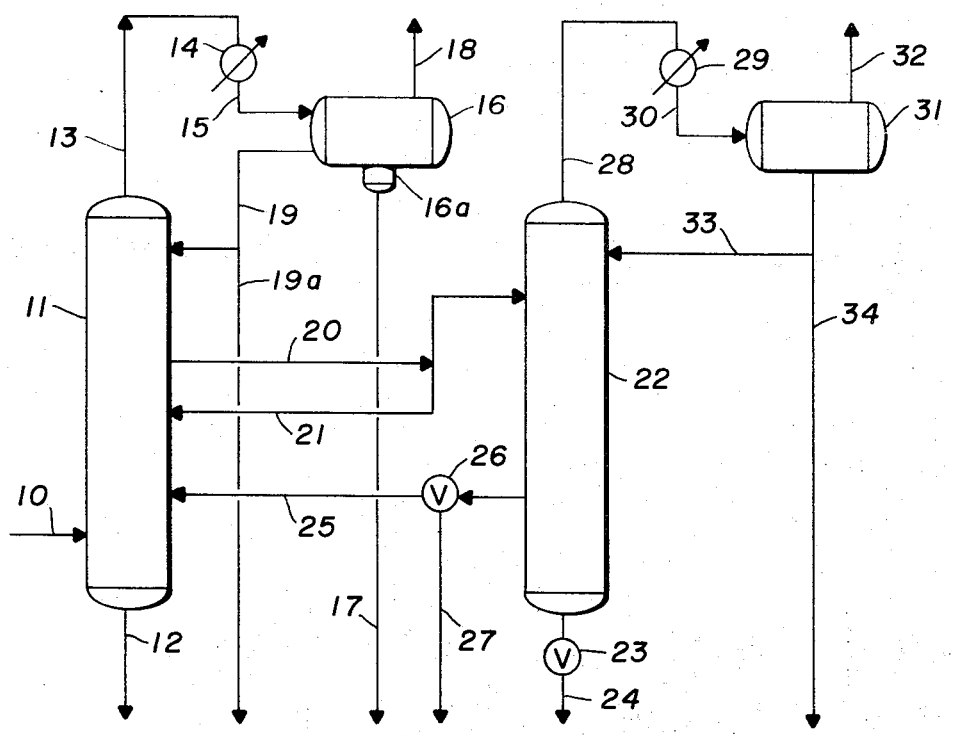

3,769,177

PURIFICATION OF CARBOXYLIC ACIDS BY PLURAL STAGE DISTILLATION WITH SIDE STREAM DRAW-OFFS

BACKGROUND OF THE INVENTION

The present invention relates to the purification of carboxylic acids. More particularly, the present invention relates to the purification of product streams of carboxylic acids produced by a catalytic system containing halogen components and which streams contain residual halogen components and water.

There have recently been proposed several processes for the production of carboxylic acids by the reaction of alcohols or olefins and carbon monoxide in the presence of catalytic systems containing (1) a Group VIII metal component such as a component containing ruthenium, rhodium, osmium, iridium, platinum, palladium, cobalt, nickel, etc. and (2) a halogen component, primarily a bromine or iodine containing component. Generally, the halogen component in the catalytic system is present as an alkyl halide such as methyl iodide or a hydrogen halide such as hydrogen iodide.

While the carboxylic acids produced by the above described processes are generally of relatively high purity as far as other organic by-products are concerned, they do contain water and relatively small amounts of halogen components as contaminants. In order that the carboxylic acids produced by such processes can be utilized in further reactions and other uses they must generally be freed from any water which is present as well as the small amounts of halogen contaminants present. When freed from such impurities the carboxylic acids thus produced are admirably suited for practically all uses in commerce and industry of such carboxylic acids and find a ready market therein.

SUMMARY

It is an object of the present invention to provide a process for the purification of carboxylic acids.

A further object of the present invention is to provide a process for the removal of water as well as the removal of halogen-containing impurities from streams of carboxylic acids.

A still further object of the present invention is to provide a process for the removal of halogenated impurities from carboxylic acids, the carboxylic acids having been prepared by the reaction of an alcohol or olefin and carbon monoxide in the presence of a catalyst system comprised of a Group VIII metal-containing component and a halogen-containing component.

Another object of the present invention is to provide for the recovery of the halogen components of such a halogen-containing catalyst system for reuse in such system.

Another object of the present invention is to provide a process for the purification of acetic and propionic acids.

These and other objects of the present invention will become apparent from the drawing, description given herein and the appended claims.

In the purification process of the present invention a stream of carboxylic acid containing from 2 to 10 carbon atoms and containing as contaminants water and certain halogenated materials, is introduced into a distillation zone. Alkyl halides present along with a portion of the water present are removed as an overhead stream from this column while substantially all hydrogen halides present are removed in the bottoms stream. Both these streams can be stored, disposed of or, recycled to the prior catalytic production process. A stream from the middle portion of the first distillation zone is removed from said zone and introduced into a second distillation zone wherein there is removed as an overhead stream the remaining portion of the water present, a stream from the middle portion of the second distillation column is recycled to the first column and a product acid stream essentially dry and substantially free of the halogen components is removed at or near the bottom of said distillation zone.

BRIEF DESCRIPTION OF THE DRAWINGS

The FIGURE is a schematic flow diagram of the purification process of the present invention.

DESCRIPTION OF PREFERRED EMBODIMENTS

The description of the manner of carrying out the purification process of the present invention follows with specific reference to the process flow diagram in the drawing. A stream of carboxylic acid to be purified, in either liquid or vapor form, is introduced via line 10 into column 11 intermediate the ends thereof, and preferably at a point in the lower half of column 11. The bottoms stream of condensed acid still containing some water and substantially all the hydrogen halide component which has been concentrated in such bottoms is removed via line 12 and preferably recycled to the reactor producing the acid product stream. An overhead stream is removed via line 13 and condensed in condenser 14, the condensed stream passing via line 15 to phase separation vessel 16. In phase separator 16 the uncondensed volatile material present, consisting substantially of carbon monoxide with a few percent of vaporized alkyl halide, can be either vented or alternately returned to the preceding process via line 18. The liquid present separates into a lighter water phase containing a minor amount of carboxylic acid and very small quantities of condensed alkyl ester and alkyl halide, and a heavier phase containing substantially all the liquified alkyl halide and only a few percent of water, ester and carboxylic acid. This heavier stream is concentrated in the sump 16A of separator 16 and is removed via line 17 for return to the prior production process. As shown, provision is made via line 19 for recycle of a portion of the lighter, predominantly water phase to distillation column 11 to serve as reflux, and for return of the remaining, usually the minor, portion of such lighter phase via line 19a to the prior production process.

The provision of separation vessel 16 and the removal thereby of the major proportion of the water and alkyl halide present in the initial feed from the overhead stream from the first distillation column results in a particularly efficient purification process. At least two prime advantages to such process are achieved. First, the alkyl halide component essential for the operation of the prior catalytic production process is concentrated, separated and returned to such process at the earliest stage of purification of the carboxylic acid stream. Furthermore, the removal from the purification process of the major proportion of the water as well as the alkyl halide present enables the remainder of the drying and purification of the carboxylic acid product to be carried out in a second distillation column of more economical size. Alternatively, it provides the ability to dry and purify a greater throughput of acid in such second distillation column than would otherwise be possible without such removal.

A stream of principally carboxylic acid and water is withdrawn from the middle portion of distillation column 11 and passes via line 20 to a second distillation column 22. If required in order to maintain liquid reflux and a minimum water content in column 11 bottoms provision is made by the junction shown for recycle of a portion of the side stream via line 21 to below the plate at which the side stream was taken. The feed stream entering column 22 via line 20 is introduced above the mid point of column 22. An overhead stream from column 22 is removed via line 28 and condensed in condenser 29, the condensed stream passing via line 30 to separation vessel 31. In this separator 31 any remaining volatile material, generally only carbon monoxide, is either vented or recycled to the production process via line 32. The relatively dilute carboxylic acid liquid solution present in separator 31 is split as shown to supply a portion as reflux to distillation column 22 via line 33 and the other portion of said dilute solution is withdrawn via line 34 for either disposal or recycle to the earlier process.

A stream is withdrawn via line 25 from the middle portion of distillation column 22 of controlled water content. For example, by control of the temperature under the pressure condition adopted of a point in column 22 near the point of removal of the side stream in line 25 a controlled small percentage of water can be maintained in such side stream. By virtue of the solubility of hydrogen halide in liquid carboxylic acid water mixtures containing from about three to about eight percent of water and the increasing volatility of such hydrogen halide in liquid mixtures of lower water content, a peak concentration of hydrogen halide occurs in the middle portion of column 22 where the composition of carboxylic acid and water liquid mixtures ranges from about three to about eight percent water. If a liquid side stream of carboxylic acid and water of such composition is withdrawn via line 25 from a point at or near such peak concentration of hydrogen halide, then substantially all the hydrogen halide present in column 22 will be removed. If desired to provide for withdrawal of side stream 25 under varying conditions of temperature and pressure in column 22, a plurality of valved take-off points may be provided, not shown, from a series of trays in the middle portion of column 22.

The side stream is passed via line 25 and recycled to the lower portion of distillation column 11. A sufficient concentration of water is maintained in the lower portion of column 11 such as by provision of reflux through line 21 to result in maintainance of substantially all of the hydrogen halide recycled in stream 25 in solution in the bottoms of column 11, which bottoms is withdrawn via line 12. So long as the concentration of water in the bottoms of column 11 is at least about four percent or more in the case of acetic acid, substantially all the hydrogen halide will remain in solution therein. There can also be provided, as shown, valve 26 and line 27 which allows the alternative of withdrawal and storage of this carboxylic acid, water and hydrogen halide stream in line 25 for later treatment when the operation of the process supplying the original acid mixture may require same. As a result of treatment and distillation in column 22, a purified acid bottoms collects therein from which is withdrawn via valve 23 and line 24 the product carboxylic acid stream. This stream is essentially dry carboxylic acid and substantially free of the halogen components present in the original crude acid stream charged to the system via line 10.

It will be apparent from the description that there is virtually no waste from the present purification process, all the streams withdrawn being adaptable to recycle to the reaction process producing the acid mixture which is purified. Thus the present process is extremely economical in the recovery of all active halogen catalyst components as well as unreacted initial reactants, such as carbon monoxide, for subsequent reuse in the catalytic production of additional carboxylic acid.

The carboxylic acids which may be purified by the process of the present invention comprise monocarboxylic acids containing water and at least one halogen contaminant as an impurity irrespective of the process by which such acids may have been produced. The present process is most useful with carboxylic acids of 2 to 10 carbon atoms, preferably 2 to 4 carbon atoms. The process is particularly applicable to the purification of acetic and propionic acids. Specifically, the monocarboxylic acid stream can be one produced by the reaction of an alcohol or olefin and carbon monoxide in the presence of a catalyst system containing a Group VIII noble metal component and a halogen component, usually bromine or iodine. Included among the Group VIII noble metals are iridium, rhodium, platinum, palladium, cobalt, nickel, osmium, ruthenium, etc. At least a part of the halogen component is usually present in the form of an alkyl halide and/or a hydrogen halide. The process of the present invention is particularly applicable to the purification of acetic and propionic acids containing halogenated impurities and more particularly to the acetic and propionic acid streams which contain iodine contaminants such as alkyl iodide or hydrogen iodide. Such acetic and propionic acid streams are produced by the reaction of, respectively, methanol and carbon monoxide or ethanol or ethylene and carbon monoxide in the presence of a catalyst system containing iridium, rhodium, platinum, palladium, osmium, or ruthenium and alkyl iodide and/or hydrogen iodide.

In the present purification process briefly described above the first distillation zone can comprise any distillation column normally used for separation and purification and can be of either the packed or plate type or can be a combination packed plate type. Generally, the first distillation zone will comprise a plate type column having from 2 to 25 trays and preferably from 5 to 20 trays and in an especially preferred embodiment employs sieve trays although other type trays such as bubble cap and ballast may be employed.

The second distillation zone can, as in the case of the first distillation zone, comprise any distillation column normally employed for the separation and purification of fluids. It can also be of the packed or plate type or a combination of the two. Generally, the second distillation zone will comprise a plate type column having from 10 to 90 trays and preferably from 20 to 60 trays. Although bubble cap trays and ballast trays may be employed in the column comprising the second distillation zone, it is preferred that sieve trays be used.

The associated condensers and liquid separation vessels employed with each of the distillation columns described are of generally conventional design and manufacture. They can be of the open vessel type or can contain baffles or other means for suppressing surging if desired. It is preferred that the liquid phase separation vessel associated with the overhead stream from the first distillation zone have provision for an internal or external sump for collection of the concentrated heavy liquid phase separated therein.

As will be recognized, various pumps, compressors, reboilers, separation vessels, etc., normally employed in carrying out chemical processes can be employed in the process described herein. Since these do not form part of this invention, the details of their use in various phases of the process description have not been included.

The temperatures and pressures employed in the two distillation zones described above will vary considerably depending upon the particular carboxylic acid stream being purified. As a practical matter these zones are most often operated at pressures from approximately atmospheric to 100 psig, although sub-atmospheric pressures may be employed if desired as well as super-atmospheric pressures well in excess of 100 psig. Temperatures within the zones will normally lie between the boiling point of the particular carboxylic acid being purified and approximately the boiling point of water at the pressure of the zone.

When employing the process of the present invention to purify acetic or propionic acids, the two distillation zones are usually operated at pressures within the range of 0 to 60 psig, preferably at pressures within the range of 0 to 45 psig. At these pressures, the bottoms temperatures of the two zones generally will be within the range of from approximately the boiling point of the acid at the pressure employed to as high as 165°C or higher, but preferably below about 165°C. The temperatures at the top of the distillation zones likewise range from the boiling point of the acid being purified at the pressure employed to as low as 100°C. The temperatures and pressures of the two distillation zones may be the same or different, but most often the temperatures and pressures of the second distillation zone are maintained at somewhat higher values than the first distillation zone.

While the point of introduction of the feed stream to the first distillation zone can vary intermediate the ends of the zone, the feed stream usually is introduced into the lower half of that column and preferably into the lower third thereof. While the stream fed to the second distillation zone can be removed from any plate in the middle portion of the first distillation zone above the point of introduction of the feed stream thereto and below the point of overhead reflux, it is preferably removed at an intermediate plate wherein there is present an approximately 80/20 percent acid/water composition at the temperature and pressure selected for operation of that zone.

The feed stream to the second distillation zone just detailed also can be introduced anywhere in the upper half of that zone. Generally, this feed is introduced into the upper one-third of the second distillation zone. The side stream taken from the second distillation zone for recycle to the first distillation zone is taken from a plate in the middle portion of the second distillation zone so selected at the specific temperature and pressure of operation that the concentration of hydrogen halide is near, and preferably at, the highest of the entire zone on that plate, since the purpose of this recycle stream of acid and water is to remove all of the remaining hydrogen halide present in the second distillation zone. The product stream removed from this second distillation zone can be removed at any point in the lower one-third and preferably from the lower one-tenth of this zone. If a fully condensed liquid product is desired the most desirable point for withdrawal of the product stream from this second zone yielding the dryest acid product is achieved by taking a bottoms stream from the second distillation zone. Alternatively, if a product stream containing no trace of metallic halide impurities is desired, then such product stream can be withdrawn in vapor form from a point above the liquid level of the second column bottoms. A convenient point, not shown, is just above or below the lowest plate in the second distillation column.

The purified product acid stream thus realized is suitable for most uses, both commercial and others, of the various monocarboxylic acids purified by the presently described process. This is particularly true with reference to the preferred acetic and propionic acids so purified. However, if it is desired that the carboxylic acid products be virtually completely free of any halogen contaminants because of the very severe requirements of certain uses as highly purified reactants in catalytic systems in which the catalyst is most sensitive to the presence of even those trace amounts of halogen impurities which may remain in the acid products purified by the present process, then these acid products can be submitted to further, even more strenuous purification by additional treatments or processes. However, such additional treatment or processes form no part of the present invention and require no discussion herein.

In the application of the present process to the preferred acetic and propionic acids the percentages of the total feed to the first distillation zone which are removed in the various fractions taken from that zone can vary somewhat. Generally, the overhead stream removed from the first distillation zone and either recycled to supply reflux thereto or recycled to an earlier stage of the production process employed, will range from approximately 30 to 50 percent, and preferably 37 to 47 percent by weight, of the total feed to the first distillation zone. Likewise, the proportion of the total feed to the first distillation zone represented by the feed stream to the second distillation zone taken from the middle portion of the first zone will generally range from about 50 to about 60 percent, and preferably from about 52 to about 58 percent, by weight of the total feed to that first zone. Thus the total take-off of these two upper streams will account for from 80 to 99.5 percent, and preferably from 90 to 99 percent, of the total feed. The percentage of the total feed to the first distillation zone removed in the bottoms stream recycled to the earlier production process will range from about 0.5 to about 6 percent by weight of the total feed to that zone, and preferably from about 2 to 5 percent thereof.

The percentages of the total feed to the second distillation zone likewise can be varied to some extent. The percentage of the feed to the second distillation zone represented by the overhead stream can be varied since in the case of that stream the portion recycled as reflux to the upper portion of the second distillation zone can be adjusted concurrently. This overhead stream generally represents from about 20 to about 50 or more percent, and preferably from about 25 to about 35 percent by weight of the total feed to the second distillation zone. The percentage of the total feed to the second distillation zone represented by the side stream taken from the middle portion of that zone and recycled to the first distillation zone represents a very small proportion of the feed and generally ranges from about one to about eight percent, and preferably, from about three to about five percent, by weight of the total feed to the second distillation zone. The withdrawal rate of the bottoms stream of purified carboxylic acid product is not limited and care need only be taken to retain sufficient liquid bottoms in the second distillation zone to accommodate the heat input from a reboiler or other heating means and to avoid starving this bottom zone to dryness.

To demonstrate the effectiveness and to illustrate the application of the process of the present invention, the following non-limiting examples are set forth.

EXAMPLE

A stream of acetic acid, water and halogen components including hydrogen iodide and methyl iodide which was produced by a noble metal and iodide catalyzed reaction of methanol with carbon monoxide was dried and purified of the halogen components in a purification and recovery system as illustrated in the drawing. The first distillation column was a packed-plate column of six inch diameter and approximately nine theoretical plates, while the second distillation column was of the packed type of six inch diameter and approximately 35 theoretical plates. The acid stream treated had an approximate composition by weight of 15 to 20 percent water, 25 to 30 percent methyl iodide, trace quantities of less than 500 ppm hydrogen iodide and the remainder acetic acid. A continuous run of five days duration, was monitored and samples of each of the streams set out in Tables 1 and 2 below were analyzed at approximately 6 hour intervals during each of the 5 days with intervals of 12 hours between each days sampling and analysis. The streams from each column were controlled to the indicated temperatures. During operation the overhead pressures in each of the columns were controlled to approximately 6.7 psig in the first column and approximately 24 psig in the second column. The results of the analysis of the samples of each stream monitored during the continuous run are set out in Tables 1 and 2 below, which refer respectively to the streams withdrawn from the first and second distillation columns.

TABLE 1. — First column

| | | Bottoms | | | Side stream | | | Overhead reflux (light phase) | | |
|---|---|---|---|---|---|---|---|---|---|---|
| | | Temperature °C | Composition | | Temperature °C | Composition | | Temperature °C | Composition | |
| Day | Time | | H₂O wt. percent | HI p.p.m. | | H₂O wt. percent | MeI wt. percent | HI p.p.m. | | H₂O wt. percent | MeI wt. percent | HI p.p.m. |

<br>

| Day | Time | Bottoms Temp °C | H₂O wt. % | HI p.p.m. | Side Temp °C | H₂O wt. % | MeI wt. % | HI p.p.m. | OH Temp °C | H₂O wt. % | MeI wt. % | HI p.p.m. |
|---|---|---|---|---|---|---|---|---|---|---|---|---|
| 1 | 0800 | 125 | 5.4 | 4,200 | 114 | 19.4 | 0.2 | 264 | 109 | 68 | 3.0 | 36 |
| | 1400 | 125 | 5.3 | 3,300 | 113 | 17.9 | 2.3 | 107 | 109 | 62 | 4.0 | 35 |
| | 2000 | 124 | 7.0 | 3,300 | 112 | 17.6 | 1.0 | 137 | 107 | 60 | 3.9 | 48 |
| 2 | 0800 | 125 | 5.1 | 2,300 | 114 | 17.7 | | 117 | 107 | 67 | 3.2 | 74 |
| | 1400 | 126 | 4.4 | 4,700 | 113 | 17.0 | 1.0 | 123 | 107 | 61 | 5.8 | 72 |
| | 2000 | 126 | 4.3 | 2,200 | 112 | 18.2 | 1.1 | 77 | 106 | 62 | 3.6 | 40 |
| 3 | 0800 | 126 | 4.0 | 3,300 | 113 | 16.1 | 0.9 | 84 | 107 | 75 | 2.8 | 61 |
| | 1400 | 125 | 4.0 | 4,500 | 111 | 21.1 | .8 | 176 | 106 | 69 | 2.9 | 5 |
| | 2000 | 125 | 5.4 | 3,300 | 111 | 20.7 | .8 | 176 | 107 | 73 | 4.4 | 36 |
| 4 | 0800 | 126 | 5.5 | 3,400 | 112 | 19.1 | 1.0 | 97 | 106 | 67 | 4.7 | 28 |
| | 1400 | 124 | | | 112 | 21.6 | | 131 | 106 | 63 | 3.8 | 34 |
| | 2000 | 125 | 5.0 | 3,300 | 112 | 19.1 | 0.8 | 126 | 107 | 67 | 4.2 | 47 |
| 5 | 0800 | 125 | 6.7 | 2,200 | 112 | 19.2 | 1.3 | 205 | 106 | 59 | 4.5 | 39 |
| | 1400 | 124 | 5.3 | 4,400 | 112 | 19.6 | 1.2 | 168 | 106 | 63 | 3.8 | 46 |
| | 2000 | 125 | 5.8 | 4,400 | 112 | 20.9 | 1.2 | 205 | 106 | 66 | 3.6 | 65 |

TABLE 2. — Second column

| Day | Time | Bottoms Temp °C | H₂O p.p.m.* | HI p.p.m. | Side Temp °C | H₂O wt. % | HI p.p.m. | OH Temp °C | H₂O wt. % | MeI wt. % | HI p.p.m. |
|---|---|---|---|---|---|---|---|---|---|---|---|
| 1 | 0800 | 152 | <100 | | 146 | 6.9 | 2,060 | 130 | 84 | 1.0 | 104 |
| | 1400 | 152 | <100 | | 147 | 4.3 | 1,040 | 131 | 69 | 1.7 | 55 |
| | 2000 | 152 | <100 | 1 | 146 | 6.4 | 1,360 | 130 | 76 | 2.1 | 111 |
| 2 | 0800 | 154 | <100 | 7 | 146 | 3.7 | 1,340 | 130 | 61 | 2.3 | 92 |
| | 1400 | 152 | <100 | 7 | 146 | 4.8 | 2,620 | 130 | 61 | 2.8 | 134 |
| | 2000 | 153 | <100 | 8 | 146 | 5.5 | 2,200 | 131 | 62 | 3.1 | 71 |
| 3 | 0800 | 152 | 200 | 9 | 146 | 5.9 | 1,040 | 131 | 59 | 2.3 | 79 |
| | 1400 | 153 | 6,800 | 8 | 147 | 3.8 | 1,600 | 129 | — | 2.2 | 125 |
| | 2000 | 154 | 2,400 | 377 | 146 | 4.7 | 1,140 | 131 | 66 | 2.2 | 121 |
| 4 | 0800 | 152 | 170 | 3 | 146 | 7.0 | 1,380 | 131 | — | 2.8 | 95 |
| | 1400 | 153 | <100 | 2 | 146 | 4.7 | 1,990 | 130 | 68 | 1.5 | 174 |
| | 2000 | 152 | <100 | 2 | 146 | 4.9 | 1,060 | 130 | 63 | 2.6 | 131 |
| 5 | 0800 | 152 | <100 | 6 | 146 | 5.0 | 2,260 | 130 | 62 | 2.4 | 212 |
| | 1400 | 152 | <100 | 10 | 145 | 5.9 | 2,260 | 130 | 65 | 3.1 | 225 |
| | 2000 | 152 | <100 | 3 | 145 | 7.1 | 2,630 | 130 | 70 | 2.3 | 206 |

*The concentration of methyl iodide in bottoms product was less than 0.50 p.p.m. in all samples.

In Table 2 above the excess water content of the bottoms product at 1,400 and 2,000 of the third day represents a column upset due to minor flooding. The result of such excess water content in the bottoms on the hydrogen iodide content thereof is evident in the 2,000 sample. Except for the above period of upset, it is apparent from the above data that the process of the present invention produces a bottoms product acid stream essentially dry and substantially free of the halogen components present in the initial feed stream of carboxylic acid and water.

What is claimed is:

1. A process for the purification and drying of monocarboxylic acid streams containing water and halogen contaminants including an alkyl halide and a hydrogen halide, which process comprises
    a. introducing an acetic or propionic acid stream containing water and said halogen contaminants into a first distillation zone,
    b. removing an overhead fraction containing a proportion of the water and a major proportion of the alkyl halide charged to said zone,
    c. removing a stream from the bottom portion of said first distillation zone containing a major proportion of the hydrogen halide charged to said zone,
    d. removing a stream from the middle portion of said zone and introducing said stream into the upper half of a second distillation zone,
    e. removing an overhead fraction from said second distillation zone containing a major proportion of the water charged to said second zone,
    f. removing a stream from the middle portion of said second zone below the point of introduction in (d) and at or near the peak concentration of hydrogen halide present in said zone,
    g. removing a product monocarboxylic acid stream from at or near the bottom of said second distillation zone, the said product acid stream being essentially dry and substantially free of the halogen contaminants charged to said first zone.

2. The process of claim 1 wherein the overhead fraction (b) is separated into a heavy phase of predominantly alkyl halide and a lighter phase of predominantly water.

3. The process of claim 1 wherein said halogen contaminants comprise iodides.

4. The process of claim 1 wherein said halogen contaminants comprise bromides.

5. The process of claim 1 wherein said monocarboxylic acid stream comprises acetic acid and said halogen contaminants comprise iodides.

6. The process of claim 1 wherein the monocarboxylic acid stream comprises acetic or propionic acid produced by the reaction of an alcohol or olefin and carbon monoxide in the presence of a catalyst system of a Group VIII noble metal component and a halogen component.

7. The process of claim 1 wherein the monocarboxylic acid stream comprises acetic acid produced by the reaction of methanol and carbon monoxide in the presence of a catalyst system of a Group VIII noble metal component and an iodide.

8. The process of claim 1 wherein a portion of stream (d) is recycled to said first distillation zone below the point at which stream (d) is removed.

9. The process of claim 1 wherein the product monocarboxylic acid stream is removed in vapor form from above the liquid level in the bottom of said second distillation zone.

10. The process of claim 1 wherein the product monocarboxylic acid stream is removed from the bottoms of said second distillation zone.

11. The process of claim 1 wherein said first distillation zone comprises a distillation column having from 2 to 25 trays.

12. The process of claim 1 wherein said second distillation zone comprises a distillation column having from 10 to 90 trays.

13. The process of claim 1 wherein the first and second distillation zones are maintained at pressures of from atmospheric to 100 psig and at temperatures of from 100° to 165°C.

14. The process of claim 1 wherein the proportion of the total feed stream (a) to said first distillation zone which is removed from said zone as overhead fraction (b) and middle stream (d) is from 80 to 99.5 weight percent of said total feed stream.

15. The process of claim 1 wherein the proportion of the total feed stream (a) to said first distillation zone which is removed from said zone as bottoms stream (c) is from 0.5 to 6 weight percent of said total feed stream.

16. The process of claim 1 wherein the proportion of the feed stream (d) to said second distillation zone which is removed from said zone as middle stream (f) is from one to eight weight percent of said feed stream.

17. The process of claim 1 wherein overhead fractions (b) and (e) and bottoms stream (c) are returned to the process for producing said monocarboxylic acid stream.

* * * * *